United States Patent
Chang

(10) Patent No.: US 8,224,242 B2
(45) Date of Patent: Jul. 17, 2012

(54) APPARATUS AND METHOD FOR REMOVING SELF-INTERFERENCE AND RELAY SYSTEM FOR THE SAME

(75) Inventor: Il Doo Chang, Anyang-si (KR)

(73) Assignee: LG-Ericsson Co., Ltd., Seoul (KR)

( * ) Notice: Subject to any disclaimer, the term of this patent is extended or adjusted under 35 U.S.C. 154(b) by 357 days.

(21) Appl. No.: 12/603,701

(22) Filed: Oct. 22, 2009

(65) Prior Publication Data

US 2010/0111018 A1   May 6, 2010

(30) Foreign Application Priority Data

Oct. 23, 2008 (KR) ........................ 10-2008-0104358

(51) Int. Cl.
*H04B 7/24* (2006.01)

(52) U.S. Cl. ........................................ 455/39
(58) Field of Classification Search .................. None
See application file for complete search history.

(56) References Cited

U.S. PATENT DOCUMENTS

| | | | | |
|---|---|---|---|---|
| 3,700,820 A | * | 10/1972 | Blasbalg et al. | 370/468 |
| 7,577,124 B2 | * | 8/2009 | Yomo et al. | 370/338 |
| 2003/0031279 A1 | * | 2/2003 | Blount et al. | 375/346 |
| 2005/0058104 A1 | * | 3/2005 | Yomo et al. | 370/335 |
| 2005/0190870 A1 | * | 9/2005 | Blount et al. | 375/346 |
| 2006/0013183 A1 | * | 1/2006 | Lee et al. | 370/343 |
| 2009/0221231 A1 | * | 9/2009 | Weng et al. | 455/15 |
| 2010/0039947 A1 | * | 2/2010 | Li et al. | 370/252 |
| 2010/0272005 A1 | * | 10/2010 | Larsson et al. | 370/315 |
| 2010/0279602 A1 | * | 11/2010 | Larsson et al. | 455/7 |
| 2011/0222428 A1 | * | 9/2011 | Charbit et al. | 370/252 |

* cited by examiner

*Primary Examiner* — Chi Pham
*Assistant Examiner* — Fan Ng
(74) *Attorney, Agent, or Firm* — KED & Associates, LLP

(57) ABSTRACT

An apparatus, a method and a relay system for removing self-interference (SI). If a relay transmitting end transmits relay-reference signals (R-RS) through a region where a base station does not transmit signals, based on a protocol predetermined with the base station, a relay receiving end obtains SI channel values from signals transmitted by the relay transmitting end and received through a self-interference channel with use of the R-RS, removes the SI from transmitting signals of an uplink or an downlink based on the SI channel values, and relays the SI removed transmitting signals.

18 Claims, 16 Drawing Sheets

(B-1)

(B-2)

APPARATUS AND METHOD FOR REMOVING SELF-INTERFERENCE AND RELAY SYSTEM FOR THE SAME

The present invention may generally relate to a relay system based on an orthogonal frequency division multiple access (OFDMA) scheme. More particularly, the present invention may relate to an apparatus and a method for removing self-interference (SI) in the relay system by using a relay-reference signal (R-RS).

BACKGROUND OF THE INVENTION

1. Field of the Invention

The present invention may generally relate to a relay system based on an orthogonal frequency division multiple access (OFDMA) scheme. More particularly, the present invention may relate to an apparatus and a method for removing self-interference (SI) in the relay system by using a relay reference signal (R-RS).

2. Background of the Related Art

International Mobile Telecommunication—Advanced (IMT-Advanced) has been developed to provide multimedia services based on an internet protocol (IP) with data rates of 1 Gbps for fixed or low mobility nodes and 100 Mbps for high mobility nodes. Relay, spectrum aggregation, uplink Multiple-Input and Multiple-Out (MIMO) and interference cancellation between cells are the main technologies which have been studied for Long Term Evolution—Advanced (LTE-Advanced).

Wireless repeaters are used to remove shadow areas of cells. Further, the wireless repeaters are set up at boundaries of the cells to extend cell coverage effectively and improve throughput.

Currently, frequency converting repeaters are mainly used as wireless repeaters, and Interference Cancellation System (ICS) repeaters have been developed recently and used to improve the use efficiency of the frequency, which cannot be provided with frequency converting repeaters.

Self Interference (SI) is the interference incurred on a receiving antenna by a transmitting antenna when the signals of the same band are simultaneously transmitted and received by the transmitting antenna and the receiving antenna. SI appears when the same frequency band is used between user equipment and the repeater and between the repeater and a base station. If the repeater transmits signals to the user equipment through a transmitting antenna thereof, the signals are also received at a receiving antenna thereof. Thus, SI occurs when the repeater receives signals from the base station. SI occurs not only at the downlink but also at the uplink.

Frequency converting repeaters adopt an out-band scheme, in which a center frequency of the frequency band used for the backhaul link, between the base station and the repeater, differs from that of the frequency band used for the access link, between the repeater and the user equipment. The ICS repeater adopts the in-band scheme which uses the same center frequencies. Specifically, the frequency converting repeater (the out-band repeater) adopts the scheme in which the frequency converting repeater receives downlink (or uplink) signals from the base station (or the user equipment) and converts the center frequency to remove the effect of the SI when the frequency converting repeater relays the signals to the user equipment (or to the base station). The ICS repeater (in-band repeater) adopts the scheme in which the ICS repeater receives downlink (or uplink) signals from the base station (or the user equipment) and converts the center frequency to remove the effect of the SI when the frequency converting repeater relays the signals to the user equipment (or to the base station). The ICS repeater (the in-band repeater) receives the downlink (or uplink) signals from the base station (or the user equipment). The scheme of eliminating wireless return signals from transmitted (or relayed) signals by a digital signal process is used in the ICS repeater to remove the SI on the receiving antenna which receives the relayed signals before the ICS repeater relays the signals to the user equipment (or to the base station) through the transmitting antenna.

The frequency converting repeater needs an additional frequency band (out band) for the delay. Thus, it uses frequency wastefully and degrades the use efficiency of the wireless frequency. Further, noise on the receiving antenna of the repeater is also amplified and transmitted, and the quality of the received signals deteriorates.

In the case of the ICS repeater, it is difficult to adopt the MIMO scheme, and the efficient improvement of the throughput cannot be anticipated. In detail, the auto-correlation between the retransmitted signals and the receiving signals is used to cancel the SI incurred on the receiving antenna of the repeater which receives the signals transmitted (relayed) by the transmitting antenna. However, exact correlation cannot be obtained easily when desired signals or noise components are large. Thus, the performance of the ICS repeater degrades. Further, if the SI is not removed completely, the signal may be subjected to an oscillation phenomenon.

For the $3^{rd}$ Generation Partnership Project (3GPP), the standard of using relays has been adopted since the relays are more efficient than wireless repeaters. A time division scheme, in which sections of the transmittance and the receipt are separated in time, has been considered to avoid SI in relays being used in 3GPP. SI occurs when the frequencies of the transmittance and the receipt of the relay are in the same band. The so-called "In-band half-Duplex scheme" is the scheme of using the same frequency band and separating the transmitting/receiving sections in time. Compared with the wireless repeater, the relay has an advantage of the performance improvement by the signal processing through upper layers such as the physical layer, the media access control layer (MAC layer) and so on. Specifically, in the case of downlink (or uplink), an in-band half-duplex relay receives signals from the base station (or the user equipment) at a predetermined time and at a predetermined frequency. Errors in the received signals are corrected through a digital signal process, and the retransmitting to the user equipment (or the base station) is performed after modulating the signals in the form of transmittance. The relay does not transmit signals to the user equipment (or the base station) while receiving the signals from the base station (or the user equipment). Like this, SI can be avoided by separating the sections of the transmitting/receiving in time.

The in-band half-duplex relay can contribute to improve the performance compared with the wireless repeater. However, the latency increases greatly on the system due to the digital signal process required to separate the sections of the transmitting/receiving in time. Further, there is a problem of lowering frequency efficiency due to the use of the source by the time division.

SUMMARY OF THE INVENTION

An apparatus, a method and a system for exactly removing self-interference (SI) by using a relay-reference signal (R-RS), are disclosed. According to an aspect of this invention, there are provided an apparatus, a method and a system for exactly removing self-interference (SI) by using a relay-reference signal (R-RS). According to the apparatus and the system, relay-reference signals (R-RS) are transmitted through a region where a base station does not transmit signals, based on a protocol predetermined with the base station, SI channel values are obtained from the signals, transmitted by the transmitting end and received through a self-interference channel, with use of the R-RS at the receiving end, the SI are removed from transmitting signals of an uplink or a downlink based on the SI channel values and the SI removed transmitting signals are relayed. According to the method, an apparatus for removing self-interference is registered at a base station, the SI apparatus receives parameters required for channel estimation from the base station, and the SI apparatus maps relay-reference signals (R-RS) to regions where the base station does not transmit signals based on the parameters and transmits the mapped R-RS signals through a transmitting end. Then, a receiving end of the apparatus for removing the SI obtains SI channel values from the signals transmitted by the transmitting end through self-interference channel with use of the R-RS, removes the SI from transmitting signals of the uplink or the downlink based on the SI channel values and relays the SI removed transmitting signals.

DETAILED DESCRIPTION OF PREFERRED EMBODIMENTS

Hereinafter, preferred embodiments of the present invention will be described in detail with reference to the accompanying drawings. In the following description of the present invention, a detailed description of widely known functions and configurations incorporated herein will be omitted when it may make the subject matter of the present invention rather unclear.

Figure 1:
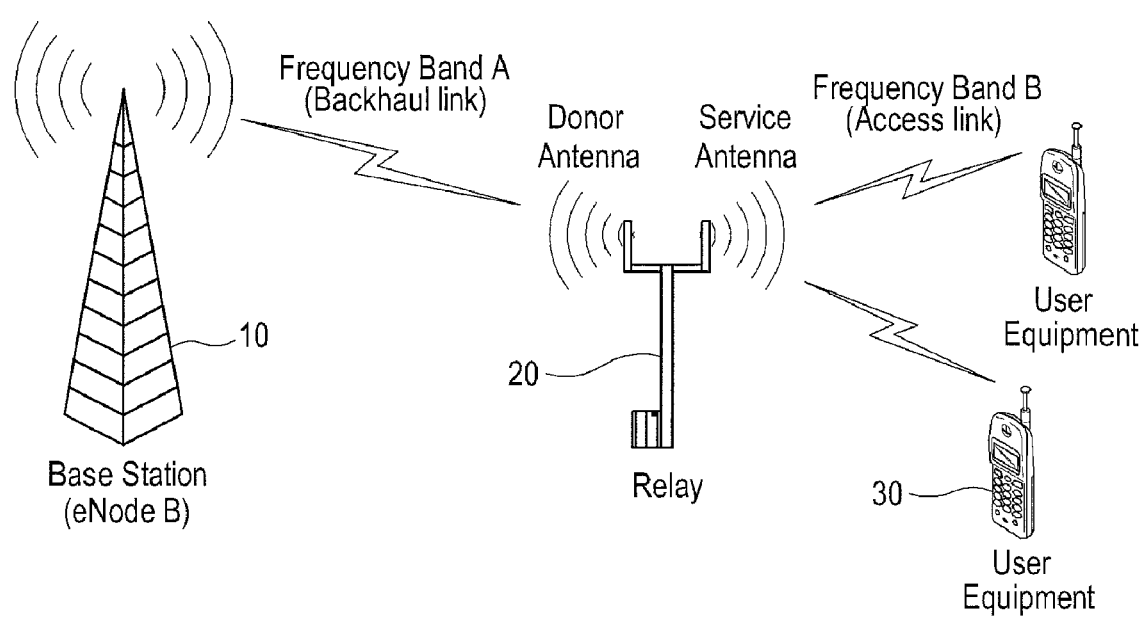
FIG. 1 shows an illustration of an exemplary relay system.

FIG. 1 shows an exemplary relay system capable of being introduced into the present invention.

As shown in FIG. 1, relay system 100 may include a base station (eNodeB) 10, relay 20 and user equipment 30 (user equipment, UE). In the present invention, relay 20 may be replaced with a repeater, and frequency band A for a link (Backhaul Link), between base station 10 and relay 20, may be identical to frequency band B for another link (Access Link) between relay 20 and UE 30. That is, relay 20 of the present invention may in some embodiments be an in-band relay where frequency band A and frequency band B are the same frequency band.

Relay 20 may include a donor antenna for communicating with base station 10 and a service antenna for communicating with user equipment 30, and thus relay 20 may perform communication arbitration between base station 10 and user equipment 30. Relay 20 may have the advantage of not requiring a new base station or needing to establish a wire backhaul since relay 20 may not need a wire backhaul but may utilize a wireless backhaul for the backhaul link.

In the downlink (DL) (or uplink (UL)), relay 20 may receive signals from base station 10 (or user equipment 30) at a predetermined time and at a predetermined frequency. Relay 20 may remove components of DL (or UL) SI from the received signals and may modulate the signals in a transmittance format before retransmitting the signals to user equipment 30 (or base station 10). At this time, relay 20 may use relay-reference signal (R-RS) for removing components of the SI.

Hereinafter, embodiments will be described based on an example of applying a relay system of the present invention to a long term evolution (LTE) system which adopts the Orthogonal Frequency-Division Multiple Access (OFDMA) scheme.

In the 3GPP LTE system, a multiple bandwidth is defined as the following table 1.

TABLE 1

| Transmission BW (MHz) | 1.4 | 3 | 5 | 10 | 15 | 20 |
|---|---|---|---|---|---|---|
| Subframe duration | | | 1.0 ms | | | |
| Subcarrier spacing | | | 15 kHz | | | |
| Physical resource block bandwidth | | | 180 kHz | | | |
| Number of available PRBs | 6 | 12 | 25 | 50 | 75 | 100 |
| Sampling frequency (MHz) | 1.92 | 3.84 | 7.68 | 15.36 | 23.04 | 30.72 |
| FFT size | 128 | 256 | 512 | 1024 | 1536 | 2048 |
| Number of occupied subcarriers | 72 | 180 | 300 | 600 | 900 | 1200 |
| Number of Resource Block | 6 | 15 | 25 | 50 | 75 | 100 |
| CP length (μs)  Normal | | | 5.21 (first symbol in Slot), 4.69 (except first symbol in slot) | | | |
| Extended | | | 16.6 | | | |

Figure 2:
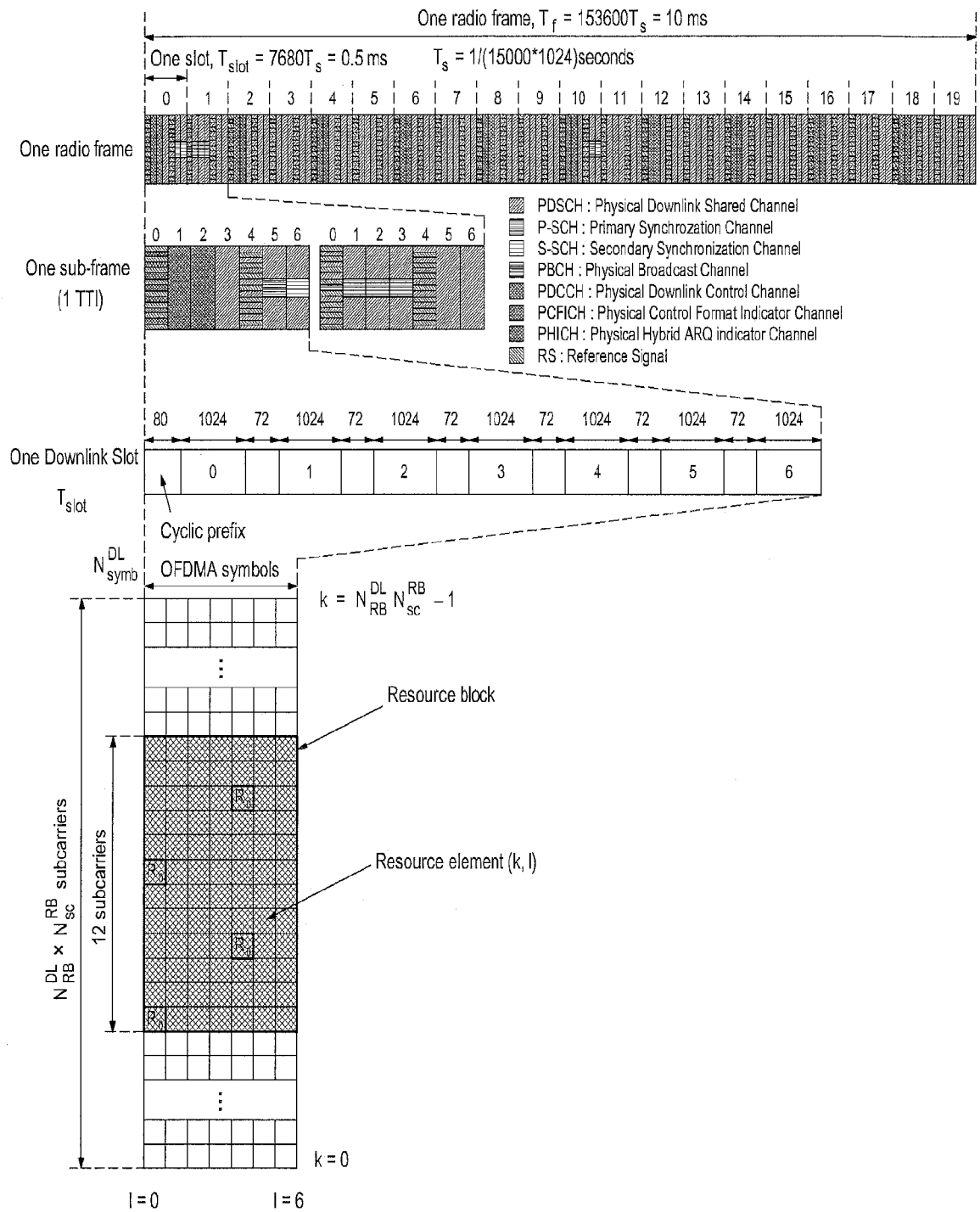
FIG. 2 shows a frame structure of an LTE DL.
Figure 3:
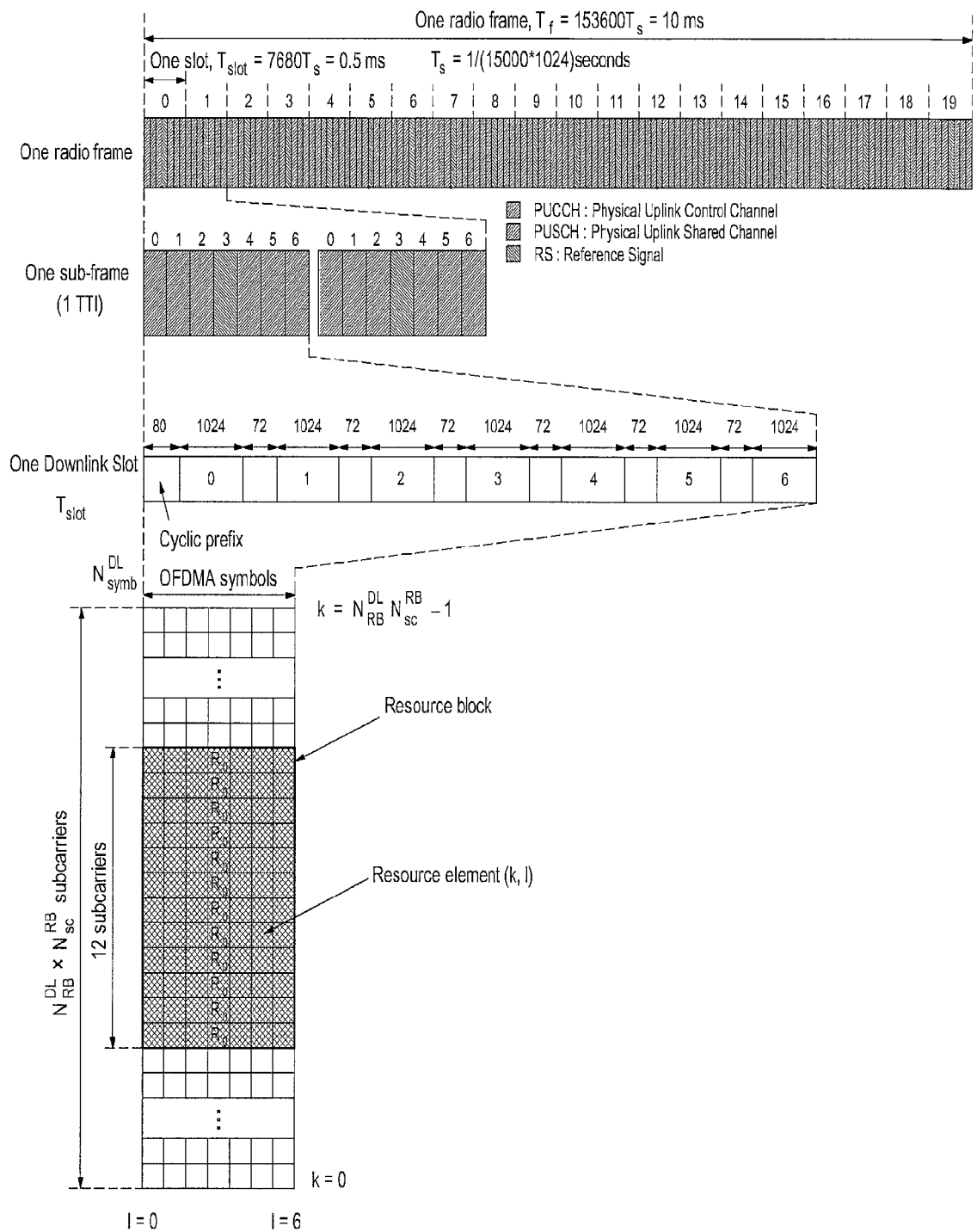
FIG. 3 shows a frame structure of an LTE UL.

The LTE system is a wireless mobile communication system which adopts the OFDMA scheme. FIGS. 2 and 3 show transmission frame structures. FIG. 2 shows a structure of an LTE DL (DownLink) frame of 10 MHz transmission bandwidth, and FIG. 3 shows a structure of LTE UP (UpLink) frame of 10 MHz transmission bandwidth.

Referring to FIG. 2, a Transmission Time Interval (TTI) is the minimum transmission unit in the LTE DL frame structure. Each TTI (sub-frame) may be composed of two consequent slots (an even-numbered slot and an odd numbered slot may form one TTI). One slot may include fifty resource blocks (RBs). Each RB may include seven symbols (l=0, . . . , 6) on the time axis and twelve subcarriers on the frequency axis. In this case, each RB may be composed of 84 (7*12=84) resource elements (REs). The DL data transmission from base station 10 to user equipment 30 may be performed by the RB unit. With the LTE DL frame structure, the DL data transmission may be performed through a Physical Downlink Shared Channel (PDSCH), and the transmission of the DL control information may be performed by a Physical Downlink Control Channel (PDCCH), a Physical Control Format Indicator Channel (PCFICH) or a Physical Hybrid ARQ Indicator Channel (PHICH). As a DL synchronization channel, there is a Primary Synchronization Channel and a Secondary Synchronization Channel. Further, a reference signal (RS) may be used for coherent detection and measurement of DL data and DL control information.

Figure 4:
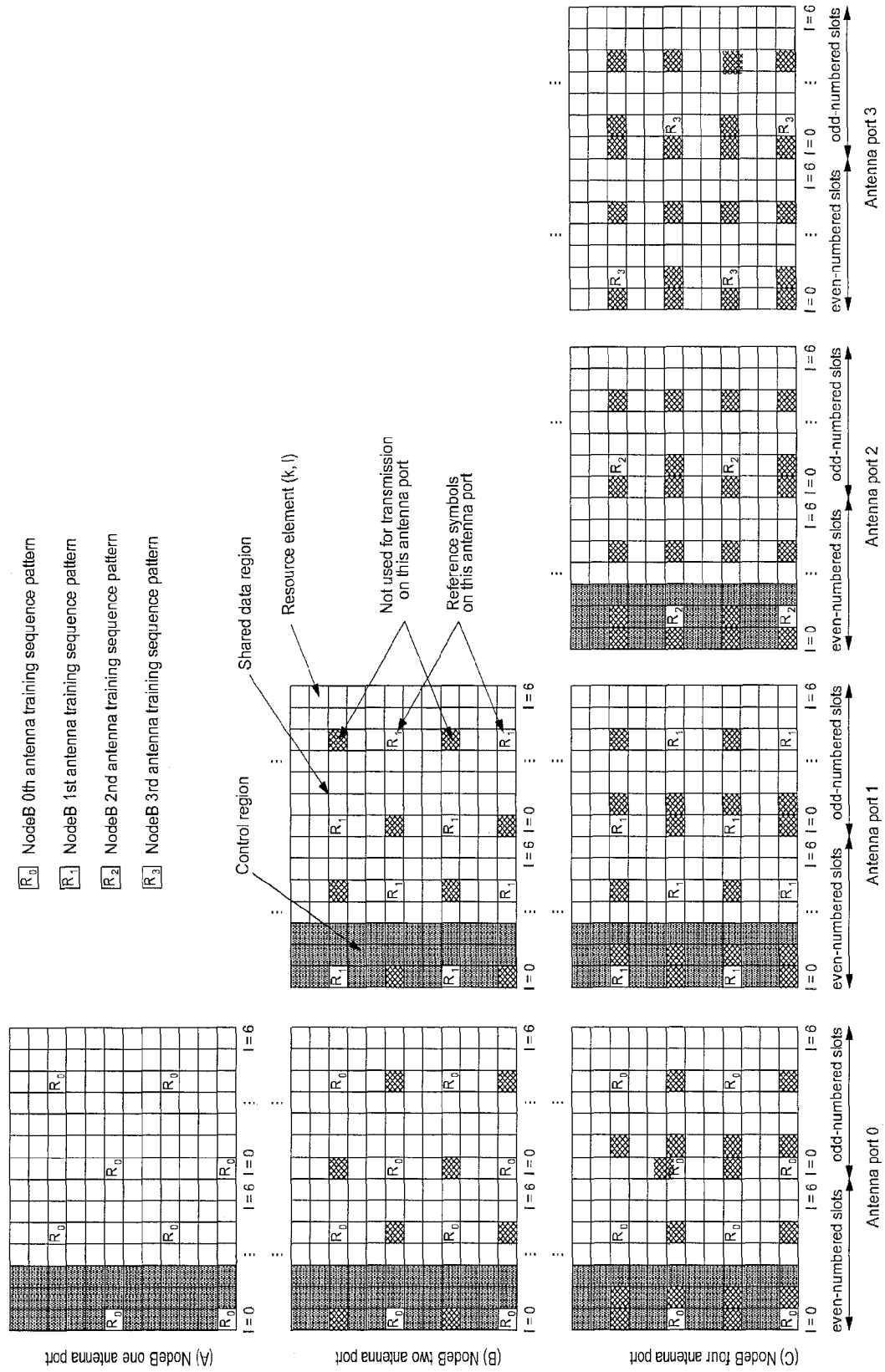
FIG. 4 shows a structure of an LTE DL RS.

FIG. 4 shows a transmission scheme of the DL RS. In FIG. 4, (A) shows a reference signal (RS) transmission scheme when the base station 10 has one antenna, (B) shows a reference signal (RS) transmission scheme when the base station 10 has two antennas, and (C) shows a reference signal (RS) transmission scheme when the base station 10 has four antennas. If base station 10 has a plurality of antennas, referring to the DL RS schemes, the patterns of RSs transmitted between antennas may have orthogonality.

Referring to FIG. 3, definitions of the TTI, the slot, the resource block (RB) and a resource element (RE) in the LTE UL (uplink) frame structure may be identical to those in the LTE DL frame structure. With the LTE UL frame structure, the UL data transmission may be performed through a Physical Uplink Shared Channel (PUSCH), and the transmission of the UL control information may be performed through a Physical Uplink Control Channel (PUCCH). A sounding reference signal (SRS) may be used to measure a UL channel, and the transmission position of the SRS may be on the last symbol (l=6) (not shown) of the second slot (odd-numbered slot) in the TTI. Further, a Demodulation RS (DMRS) may be used as a signal for coherent detection and measurement of UL data and UL control information.

Figure 5:
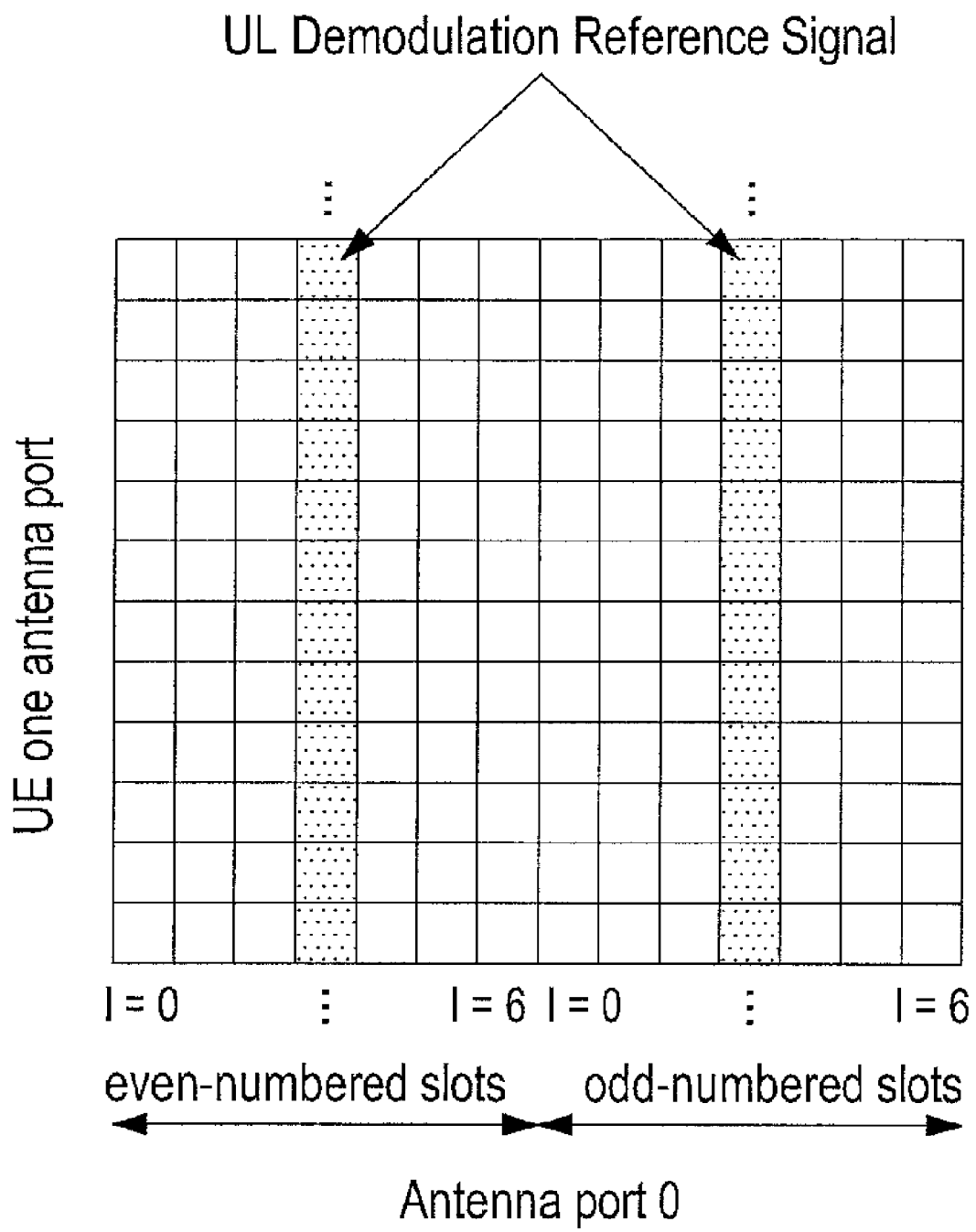
FIG. 5 shows a structure of an LTE UL DMRS.

FIG. 5 shows a transmission scheme of UL DMRS in LTE. The UL DMRS may be located on the fourth symbol (l=3) and transmitted.

The LTE DL/UL frame structures and transmission schemes of DL RS and UL DMRS are described above. Hereinafter, a scheme for removing the SI with use of the DL RS and UL DMRS of base station 10 in relay 20 (relay 20 may generate a DL/UL relay-reference signal (R-RS) based on the DL RS and a UL DRMS) and relaying the signal from base station 10(or user equipment 30) at DL (or UL). In order to remove a DL SI by relay 20, first, relay 20 should be recognized by base station 10 (or registered in base station 10) and may receive parameters, required to estimate the SI channel, from base station 10 (initial registration process of a DL relay). The initial registration process of the DL relay is described in detail below.

(1) Relay 20 established in a network may find a DL channel of base station 10 and perform synchronization with base station 10 by reading a synchronization channel (P-SCH, S-SCH) among the DL channels.

(2) Relay 20 may obtain parameter information for the UL transmission in the PBCH and PDSCH among the DL channels transmitted from base station 10.

(3) Relay 20 may perform the registration in base station 10 through a random access channel (RACH) process with use of the obtained parameter information of the UL transmission.

Figure 10:
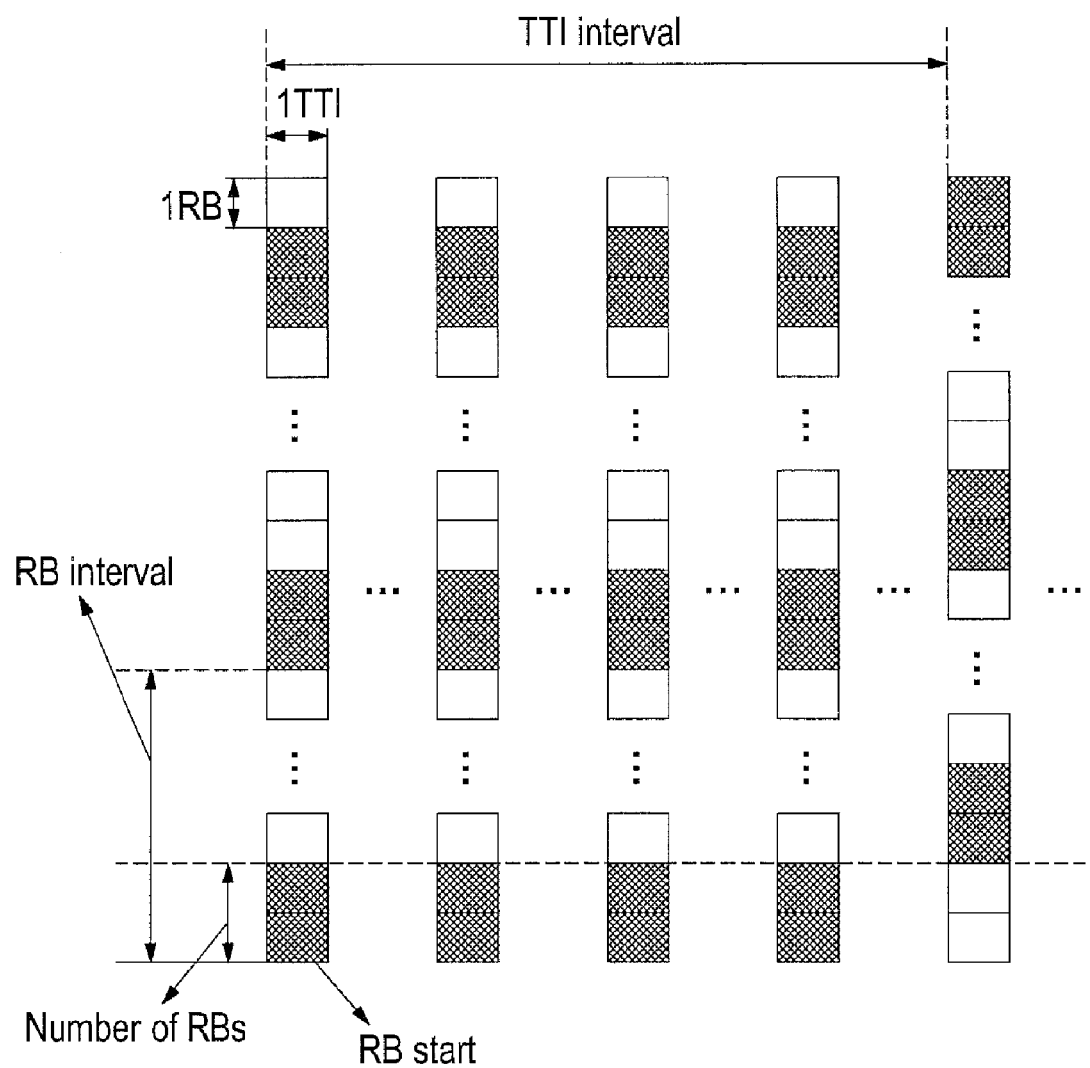
FIG. 10 is an exemplary diagram for allocating R-RS transmitting resources for DL/US SI channel estimation at the base station and the relay.

(4) Upon completing the registration of relay 20 in base station 20, base station 10 may transmit parameters required to remove DL SI of relay 20 to relay 20. The parameters for removing the DL SI of relay 20 may include a parameter for generating a DL R-RS pattern, which is transmitted to estimate the SI, a transmission cycle of the DL RS and so on. During this process, base station 10 may inform relay 20 of allocation of RB and what sequence numbers will be given to the allocated RB. FIG. 10 shows denotations of the transmitted parameters.

After performing the initial registration process of the DL relay, relay 20 may perform a channel estimation process of an initial DL SI. At this point, relay 20 may transmit a DL R-RS based on a resource scheduling message exchange between base station 10 and relay 20 while base station 10 does not transmit signals During the transmission of the DL R-RS, relay 20 may not perform data transmitting/receiving with user equipment 30. However, relay 20 may obtain DL SI channel values over the whole band for one or a plurality of TTI interval(s). The channel estimation process of the DL SI is described in detail below.

(1) Relay 20 may find a transmission position for the DL SI channel estimation with use of the parameters transmitted from base station 10. The control information transmission interval (PDCCH) of base station 10, broadcasting information transmitting interval (PBCH) and synchronization channel intervals (P-SCH, S-SCH) and interval(s) for transmitting RS of base station 10 cannot not be used, when relay 20 transmits the DL-RS. That is, relay 20 may not use an interval to which base station 10 allocates RS and channels (synchronization channel, common control channel, broadcasting channel) commonly used by user equipment 30. DL R-RS may be allocated on a shared data channel. If the DL RS of base station 10 has the transmission scheme as shown in FIG. 4, the available regions for transmitting a DL-RS by relay 20 may be shown as (B) and (C) in FIGS. 11 to 13 according to the number of transmitting antenna(s) (TX) Antenna(s) of base station 10.

Figure 11:
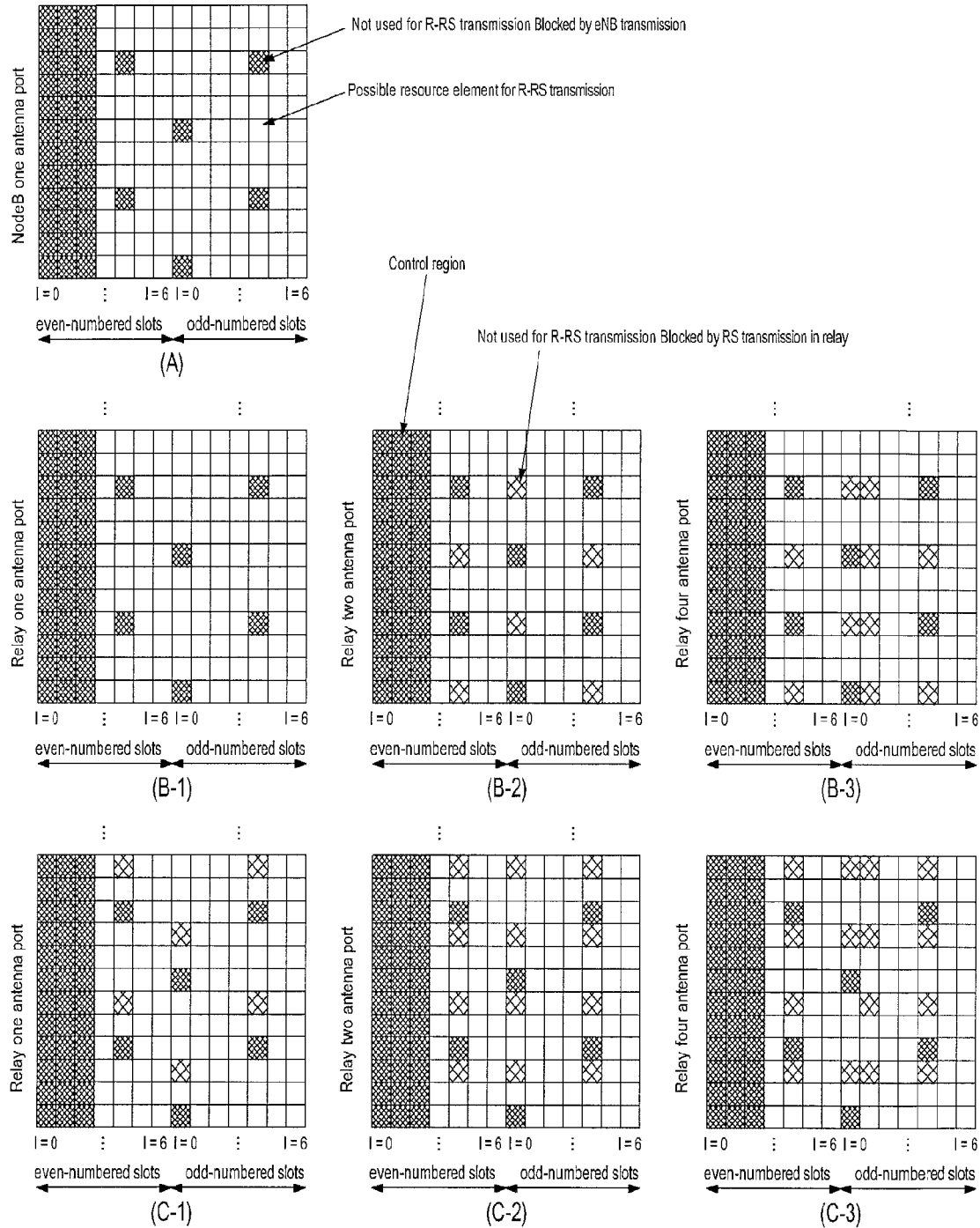
FIG. 11 is a diagram showing resource regions available for transmitting the R-RS at a DL relay when the base station has two transmitting antennas in accordance with an embodiment of the present invention.

FIG. 11 shows control channels for relay 20, RS transmission patterns and the available intervals for transmitting a DL-RS (data transmission interval(s) of DL RB) by relay 20 based on the transmission patterns when the number of the transmitting antennas of base station 10 is one. In FIG. 11, (A) shows the control channel and the intervals used for RS transmission (RS transmitting patterns). Relay 20 may find the interval(s) for transmitting the DL R-RS within the RB in consideration of "(A)" and the number the transmitting antenna(s) (TX) antenna(s) of relay 20. In FIGS. 11, (B-1), (B-2) and (B-3) show available transmission intervals for a DL R-RS that satisfy the condition $|PCI_{eNodeB} - PCI_{relay}| \mod 6 = 0$, and (C-1),(C-2) and (C-3) show available transmission intervals for a DL R-RS that satisfy the condition $|PCI_{eNodeB} - PCI_{relay}| \mod 6 \neq 0$. This shows only the case of $|PCI_{eNodeB} - PCI_{relay}| \mod 6 \neq 2$. For an instance, the RS transmitting scheme of an LTE may be configured to have the same patterns when the difference of PCI is 6 for a base station 10 having one transmitting antenna or when the difference of PCI is 3 for a base station 10 having more than two transmitting antennas.

Figure 12:
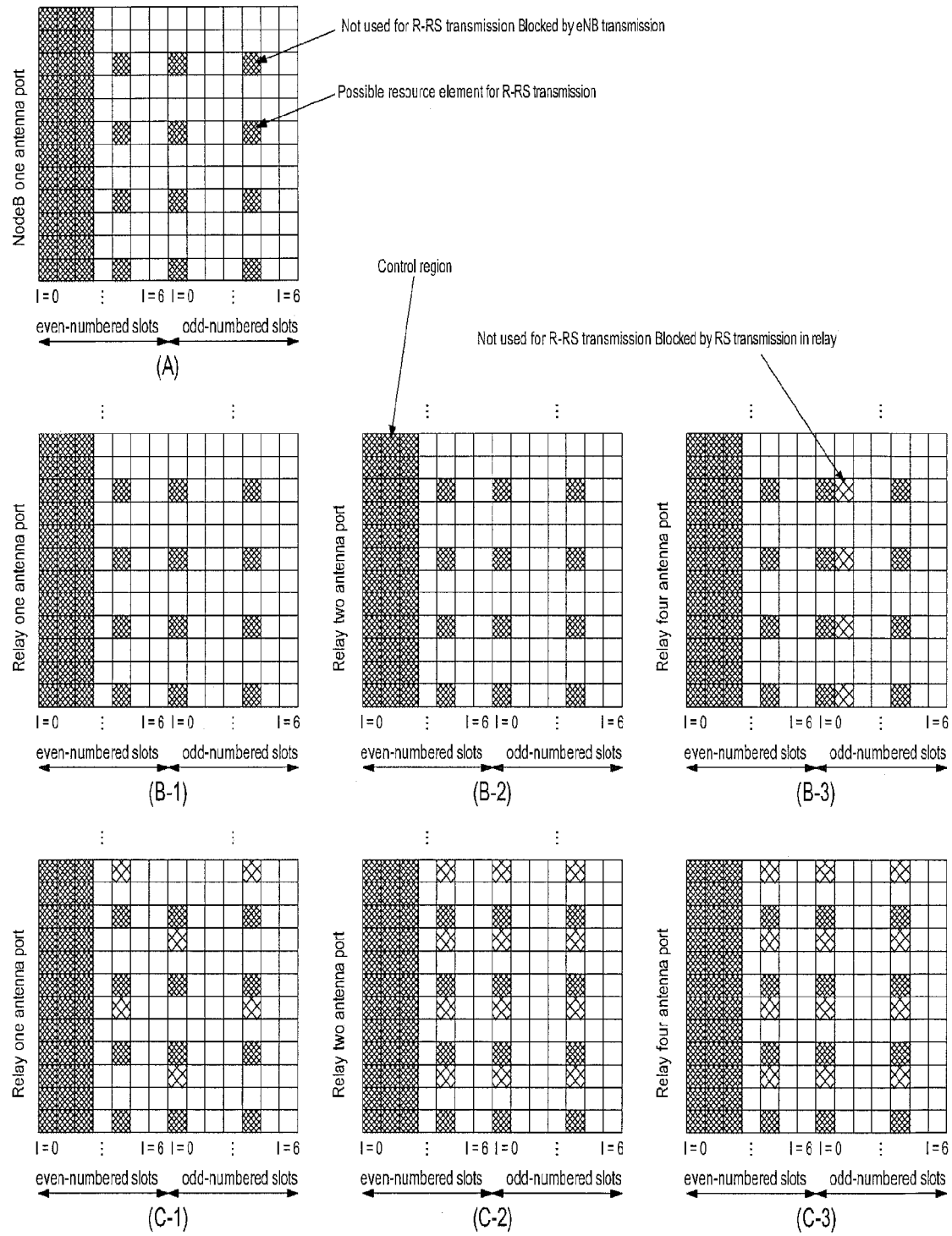
FIG. 12 is a diagram showing resource regions available for transmitting the R-RS at a DL relay when the base station has one transmitting antenna in accordance with an embodiment of the present invention.

FIG. 12 shows control channels of relay 20, RS transmission patterns and the available intervals for transmitting a DL-RS (data transmission interval(s) of DL RB) by relay 20 based on the transmission patterns when the number of transmitting antennas of base station 10 is two. In FIG. 12, (A) shows the control channel and the intervals used for RS transmission (RS transmitting patterns). Relay 20 may find the interval(s) for transmitting the DL R-RS within the RB in consideration of "(A)" and the number the transmitting antennas (TX antennas) of relay 20. In FIGS. 12, (B-1), (B-2) and (B-3) show available transmission intervals of a DL R-RS that satisfy the condition |PCI$_{eNodeB}$–PCI$_{relay}$|mod3=0, and (C-1), (C-2) and (C-3) show available transmission intervals of a DL R-RS that satisfy the condition |PCI$_{eNodeB}$–PCI$_{relay}$|mod 3≠0. This shows only the case of |PCI$_{eNodeB}$–PCI$_{relay}$|mod3=2.

Figure 13:
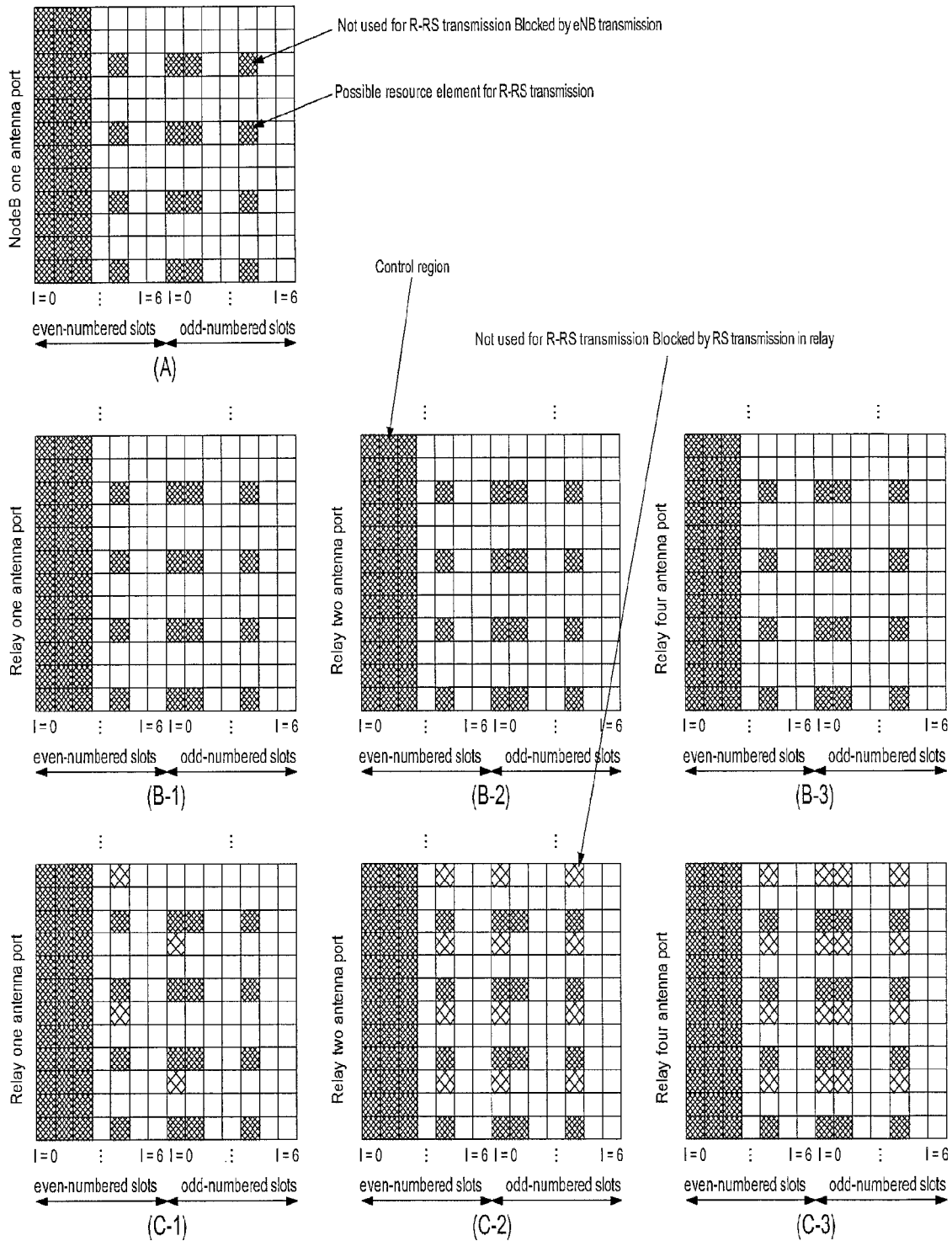
FIG. 13 is a diagram showing resource regions available for transmitting the R-RS at a DL relay when the base station has four transmitting antennas in accordance with an embodiment of the present invention.

FIG. 13 shows control channels of relay 20, RS transmission patterns and the available intervals for transmitting a DL-RS (data transmission interval(s) of DL RB) by relay 20 based on the transmission patterns when the number of the transmitting antennas of base station 10 is four. In FIG. 13, (A) shows the control channel and the intervals used for RS transmission (RS transmitting patterns). Relay 20 may find the interval(s) for transmitting the DL R-RS within the RB in consideration of "(A)" and the number of transmitting antennas (TX antennas) of relay 20. In FIGS. 13, (B-1), (B-2) and (B-3) show available transmission intervals of a DL R-RS that satisfy the condition |PCI$_{eNodeB}$–PCI$_{relay}$|mod 3=0, and (C-1), (C-2) and (C-3) show available transmission intervals of a DL R-RS that satisfy the condition |PCI$_{eNodeB}$–PCI$_{relay}$|mod3≠0. This shows only the case of |PCI$_{eNodeB}$–PCI$_{relay}$|mod3=2.

In considering the RS transmitting patterns of base station 10 and relay 20, the DL R-RS transmitting patterns of relay 20 may be denoted as the following table 2.

TABLE 2

|  |  |  | antenna number of relay | | |
|---|---|---|---|---|---|
|  |  |  | 1 | 2 | 4 |
| antenna number of base station | 1 | |PCI$_{eNode\,B}$ – PCI$_{relay}$| mod 6 = 0 | Case 1 | Case 2 | Case 3 |
|  |  | |PCI$_{eNode\,B}$ – PCI$_{relay}$| mod 6 ≠ 0 | Case 4 | Case 5 | Case 6 |
|  | 2 | |PCI$_{eNode\,B}$ – PCI$_{relay}$| mod 3 = 0 | Case 7 | Case 8 | Case 9 |
|  |  | |PCI$_{eNode\,B}$ – PCI$_{relay}$| mod 3 ≠ 0 | Case 10 | Case 11 | Case 12 |
|  | 3 | |PCI$_{eNode\,B}$ – PCI$_{relay}$| mod 3 = 0 | Case 13 | Case 14 | Case 15 |
|  |  | |PCI$_{eNode\,B}$ – PCI$_{relay}$| mod 3 ≠ 0 | Case 16 | Case 17 | Case 18 |

Figure 14:
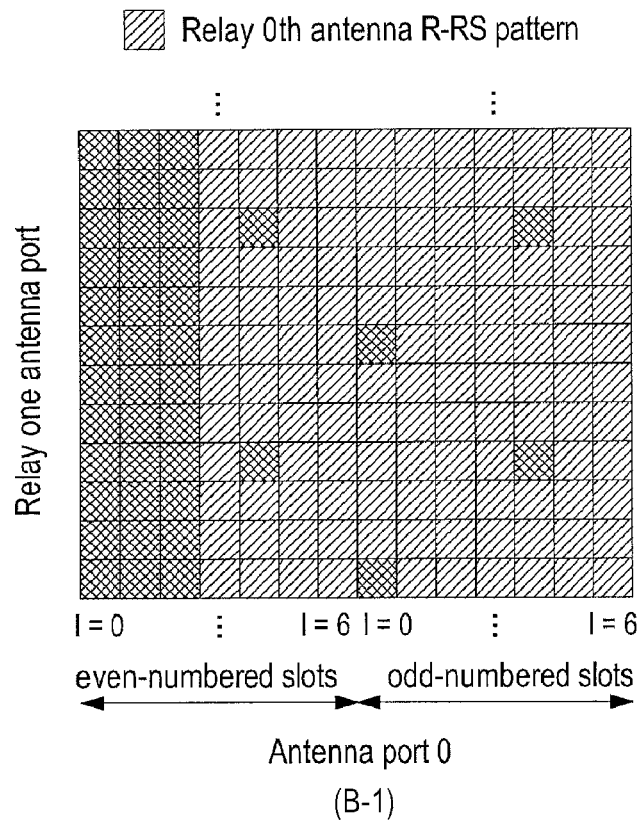
FIG. 14 is an exemplary diagram showing mapping a DL RS at a DL relay when the base station has one transmitting antenna and the number of transmitting antenna(s) of the DL relay is 1 in accordance with an embodiment of the present invention.
Figure 14:
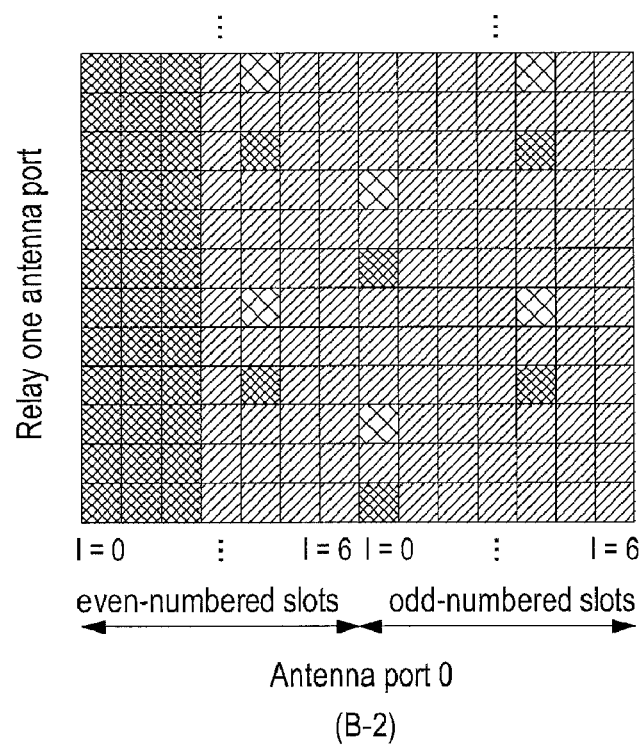
Figure 15:
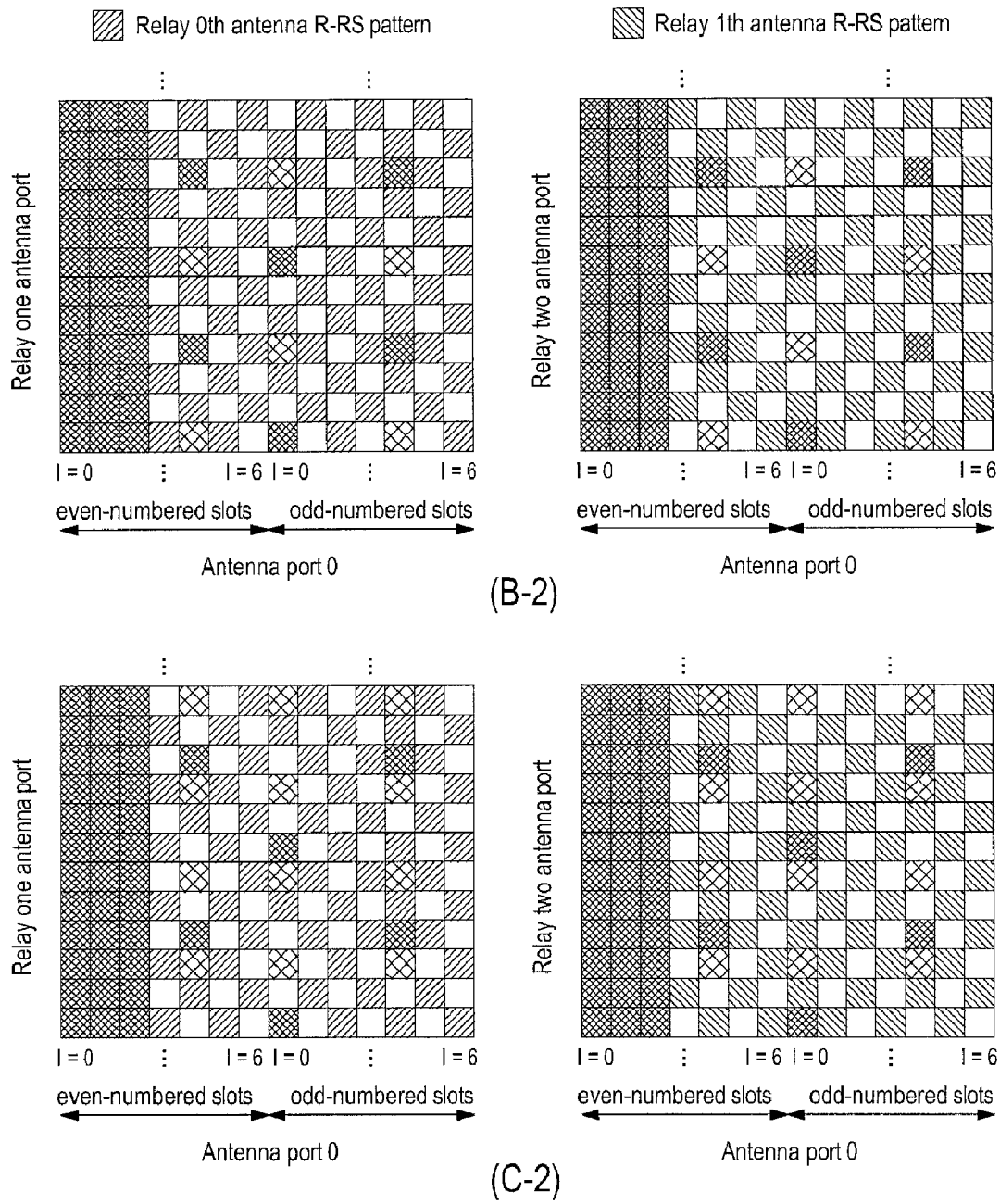
FIG. 15 is an exemplary diagram showing mapping a DL RS at a DL relay when the base station has one transmitting antenna and the number of transmitting antenna(s) of the DL relay is 2 in accordance with an embodiment of the present invention.

(2) Relay 20 may perform a mapping of a DL R-RS on the data transmission interval(s) of a DL RB which is available for transmitting a DL R-RS (except the control information transmission interval (PDCCH) of base station 10, PBCH interval, synchronization channel intervals (P-SCH, S-SCH) and interval(s) for transmitting RS of base station 10) at step (1). Then, relay 20 may modulate the mapped DL R-RS in a form suitable for RF transmission and transmit the modulated DL R-RS through a transmitting end ("62" of FIG. 6) of relay 20. At this time, base station 10 does not transmit data to the RB where relay 20 transmits the DL R-RS. However, base station 10 may transmit the RS to the interval where the DL R-RS is transmitted, since the RS transmitted by base station 10 is required to be transmitted to user equipment 30 being serviced by base station 10 (for user equipment's measurement with use of the RS). This is the same as the channels (that is, the synchronization channel, the common control channel, the broad casting channel and so on) commonly used by user equipments 30. FIGS. 14 and 15 show examples of a DL R-RS mapping of relay 20. The examples shown in FIG. 14 correspond to (case 1) and (case 4) in table 2, and the examples shown in FIG. 15 correspond to (case 2) and (case 5). Examples of the other cases are omitted. For the other cases, the antennas of the relay may use the resource regions, which are available for a DL R-RS, by dividing the resource regions into orthogonal patterns (For an example, the left and right patterns of (B-2) is perpendicular to the left and right patterns of (C-2) in FIG. 15).

(3) The DL R-RS transmitted from the transmitting end ("62" of FIG. 6) of the relay at step (2), may be received at a receiving end ("61" of FIG. 6) of the relay via a DL SI channel. The received signals are demodulated and transmitted to DL SI channel estimating unit 6124. DL SI channel estimating unit 6124 may perform the DL SI channel estimation by extracting the received signals at the position of the RB used for transmitting the DL R-RS at step (2). This process can be expressed as Equation 1 as follows.

$$Y_{Relay\,received} = H_{SI\_coefficient} \cdot X_{Relay\_RS} + N \quad \text{[Equation 1]}$$

Herein, X$_{Relay\_RS}$ is the DL R-RS which relay 20 transmits. The DL R-RS's of the transmitting antenna of relay 20 are orthogonal to each other, as an example shown in FIGS. 14 and 15, so that it is possible to get channel values between the transmitting antenna and receiving antenna of the relays. SI values H$_{SI\_coefficient}$ of every antenna can be estimated by ignoring the value N of the noise in Equation 1 (the magnitude of error can be disregard) and dividing the received signals Y$_{Relay\,received}$ by DL R-RS X$_{Relay\_RS}$ (channel information of DL SI is estimated partially).

(4) Relay 20 may calculate the channel values of DL SI of all bandwidths by repeating steps (1) to (3) with respect to all the bandwidths (estimating the DL SI channel information for all the bandwidths).

Relay 20 may obtain the DL SI channel information of all bandwidths through the initial registration process of the DL relay and the initial DL SI channel estimation process as mentioned above. Thereafter, relay 20 may remove the SI by using a DL R-RS and relay the signals transmitted from base station 10 to user equipment 30 at the DL. This process is described in detailed below.

Relay 20 may receive data from base station 10. The received signals may be expressed as Equation 2 below.

$$Y_{received} = H_{B/H} \cdot X_{eNodeB} + H_{SI} \cdot X_{Relay\_TX} + N \quad \text{[Equation 2]}$$

In Equation 2, H$_{SI}$ is the DL SI channel value, X$_{Relay\_TX}$ is the signal transmitted from relay 20 to DL. The removal is possible because relay 20 already knows the values of H$_{SI}$ and X$_{Relay\_TX}$. These values are the DL SI values which are to be removed. Thus, the DL SI free signals can be expressed as Equation 3 below.

$$Y_{SI\text{-}Cancellation} = Y_{received} - H_{SI} \cdot X_{Relay\_TX} \cong H_{B/H} \cdot X_{eNodeB} + N \quad \text{[Equation 3]}$$

The remaining signals after removing the DL SI are the signals transmitted from base station 10. The RS of base station 10 may be used to decode the remaining signals. The estimation of H$_{B/H}$ may be performed with an RS transmitted by base station 10. Thus, the signal $X_{eNodeB}$ transmitted by base station 10 may be decoded as Equation 4 below.

$$\overline{X}_{eNodeB} = \frac{Y_{SI\_Cancellation}}{H_{B/H}} \quad \text{[Equation 4]}$$

Information on the B/H channel, which is an air interface channel between base station 10 and relay 20, may be obtained from the RS transmitted from base station 10. The signal transmitted by base station 10 can be extracted from the remaining signal after removing the DL SI based on the information of the B/H channel. The signal $\overline{X}_{eNodeB}$ transmitted from base station 10 may be forwarded to transmitting end 62 of relay 20 and modulated with a scheme (by applying a Channel Quality Indicators (CQIs), pre-coding and Rank Indicators (RIs)) suitable for the channel between user equipment 30 and the transmitting antenna of the relay. Further, the DL R-RS may be transmitted through a region of the DL signal. Thus, base station 10 can transmit the DL R-RS to estimate the SI channel continuously, and the information on the DL SI channel is updated by continuous estimation and traceability. The RS may be transmitted with the DL signal for coherent detection of user equipment 30 under the relay.

Figure 6:
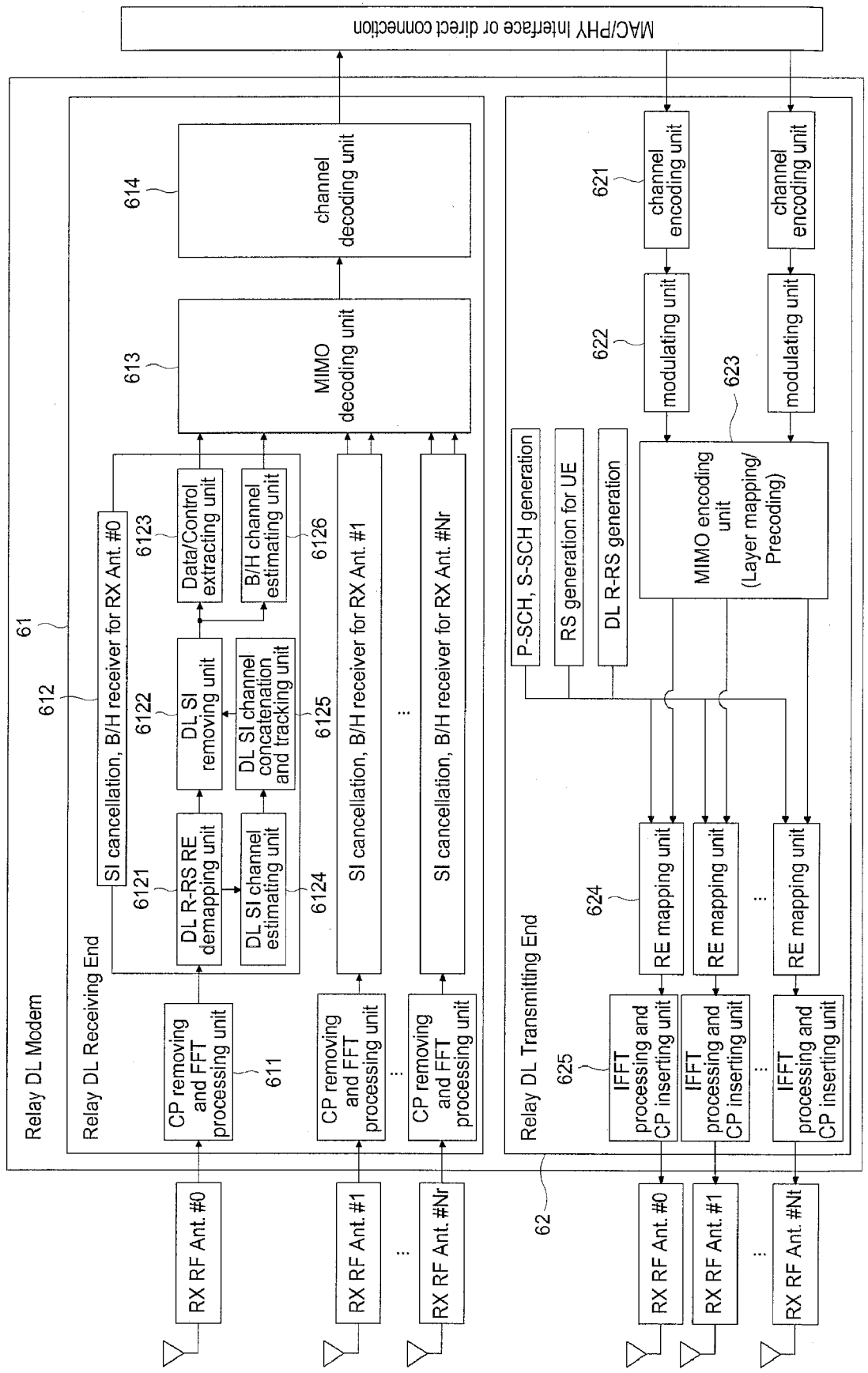
FIG. 6 shows a block diagram of a relay for removing self-interference (SI) of a DL in accordance with an embodiment of the present invention.

Referring to FIG. 6, the configuration of relay 20, which relays the signals from base station 10 to user equipment 30 at the DL, will be described below. FIG. 6 shows a detailed configuration of the relay for removing DL self-interference (SI) in accordance with the present invention and the configuration of the DL modem of a relay which uses the DL R-RS.

DL transmitting end 62 of the relay may transmit the DL R-RS by mapping DL R-RS on the interval (a region to which RS and data excluding the common channel (the synchronization channel, the common control channel, the broad casting channel and so on)) are allocated, that is the shared data channel).

DL receiving end 61 of the relay may estimate the DL SI channel information with the signals received from the DL transmitting end 62 of the relay and remove the DL SI component from the signals received from base station 10 based on the DL SI channel information. The DL SI components removed from the signals may be transmitted to user equipment 30 through DL transmitting end 62 of the relay.

CP removing and FFT processing unit 611 at DL receiving end 61 of the relay may remove the CP, which is inserted for preventing interference between symbols, from the signal received through a relay receiving antenna (RX Antenna) and convert the signals into the frequency domain by performing a Fast Fourier Transform (FFT) process.

DL R-RS RE demapping unit 6121 may separate position components of the DL R-RS which has undergone the FFT process.

DL SI channel estimating unit 6124 may estimate the DL SI channel by using the DL R-RS which has been separated by DL R-RS RE demapping unit 6121. The estimated DL SI channel information does not relate to all the bandwidths. Thus, DL SI channel concatenation and tracking unit 6125 may gather the partially estimated DL SI channel information and form DL SI channel information for all bandwidths.

DL SI cancellation unit 6123 may remove the DL SI components from received signal $Y_{received}$ with use of DL SI channel information ($H_{SI}$) and a signal ($X_{relay\_TX}$) transmitted by DL transmitting end 62 of the relay. In the DL SI removed signals, only the signals transmitted by base station 10 may remain (see Equation 4). The signals transmitted by base station 10 may be divided into Data/Control components and so on, at Data/Control extracting unit 6123, and forwarded to MIMO decoding unit 613. The RS transmitted from base station 10 may be forwarded to B/H channel estimating unit 6126 for the use of estimating the B/H channel between base station 10 and relay 20. The information of the B/H channel (the air interface channel) between base station 10 and relay 20 may be transmitted to MIMO decoding unit 613. The MIMO decoding unit 613 may decode (extract) only the signals transmitted from base station 10 as shown in Equation 4 by using the information of the B/H channel.

The above processes may be performed for every receiving antenna of the relay 20. MIMO decoding unit 613 may perform the processes of QAM slicing, combining and so on. Channel decoding unit 614 may perform a convolutional decoding, turbo decoding and so on according to the channel decoding method, and then may perform error correction. The MIMO decoding and the channel decoding may be performed with widely known methods.

Channel encoding unit 621 at DL transmitting end 62 of the relay may perform a coding process suitable for transmitting channels, and modulating unit 622 may perform QAM modulation and so on and transmit the modulated signals to MIMO encoding unit 623. MIMO encoding unit 623 may perform layer mapping and pre-coding in consideration of the number of transmitting antenna(s) and the characteristics of the channels. Resource mapping may be applied to the symbols which have undergone MIMO encoding for transmitting the symbols to every transmitting antenna. The resource mapping, performed by RE mapping unit 624, is a process for allocating the data and the control information to a resource element. During the process of estimating the initial DL SI channel, the DL R-RS for estimating the DL SI channel is the information which is mapped by RE mapping unit 624. OFDM transmitting symbols are formed by performing an Inverse FFT (IFFT) and inserting a CP at the IFFT processing and CP inserting unit, and are then transmitted through the relay transmitting antenna (TX Antenna).

Figure 8:
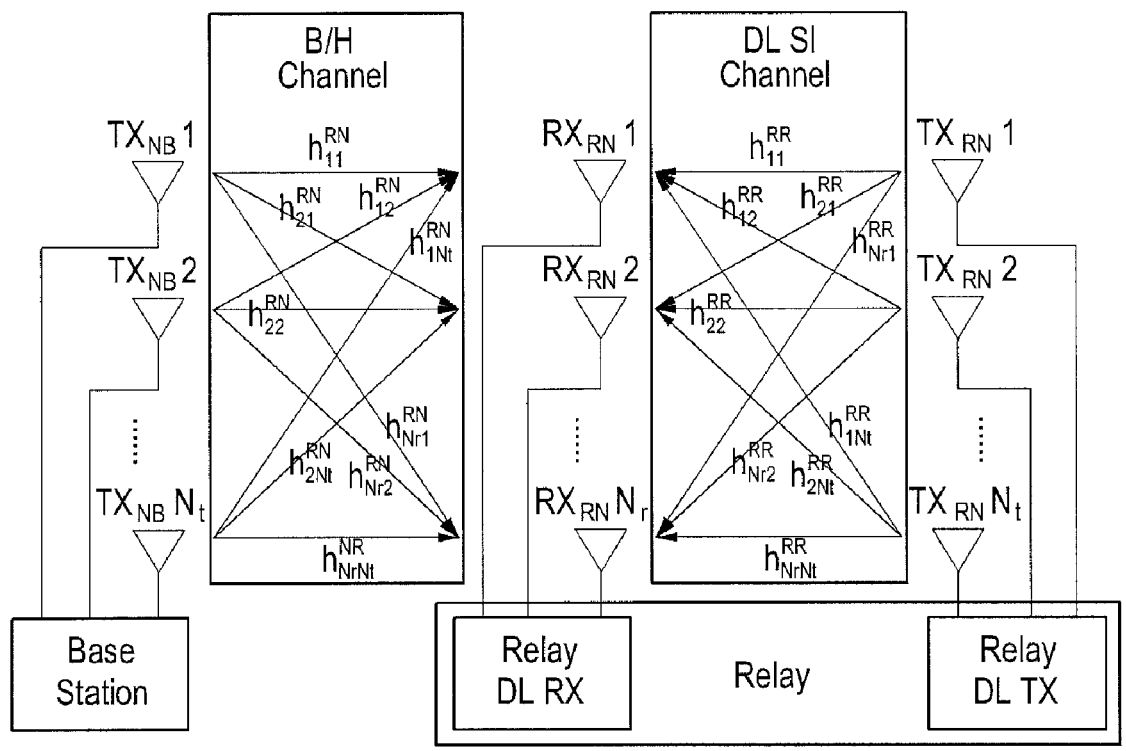
FIG. 8 shows a schematic diagram of a DL wireless channel of an LTE relay.

FIG. 8 shows wireless channels in base station 10, and DL receiving antenna (RX antenna) and DL transmitting antenna (TX antenna) of relay 20. The wireless channels between base station 10 and the receiving antennas of the relay are referred to as B/H channels. The wireless channels between the transmitting antennas and the receiving antennas of the relay are referred to as DL SI channels. The wireless channels are defined with respect to every transmitting port (TX port) and receiving port (RX port).

In order to remove UL SI at relay 20, relay 20 should be recognized by base station 10 and may receive parameters, which are required to estimate the SI channel, from base station 10 (initial registration process of a UL relay). The initial registration process of the UL relay may be performed in the same manner as the initial registration process of the DL relay.

After performing the initial registration process of the UL relay, relay 20 may perform a channel estimation process of an initial UL SI. At this stage, relay 20 may transmit UL R-RS based on a resource scheduling message exchange between base station 10 and relay 20 while base station 10 does not transmit signals. During the transmission of the UL R-RS, relay 20 may not perform data transmitting/receiving with user equipment 30. However, relay 20 may obtain UL SI channel values over the whole band for one or a plurality of TTI interval(s). The channel estimation process of the UL SI is described in detail below.

Figure 16:
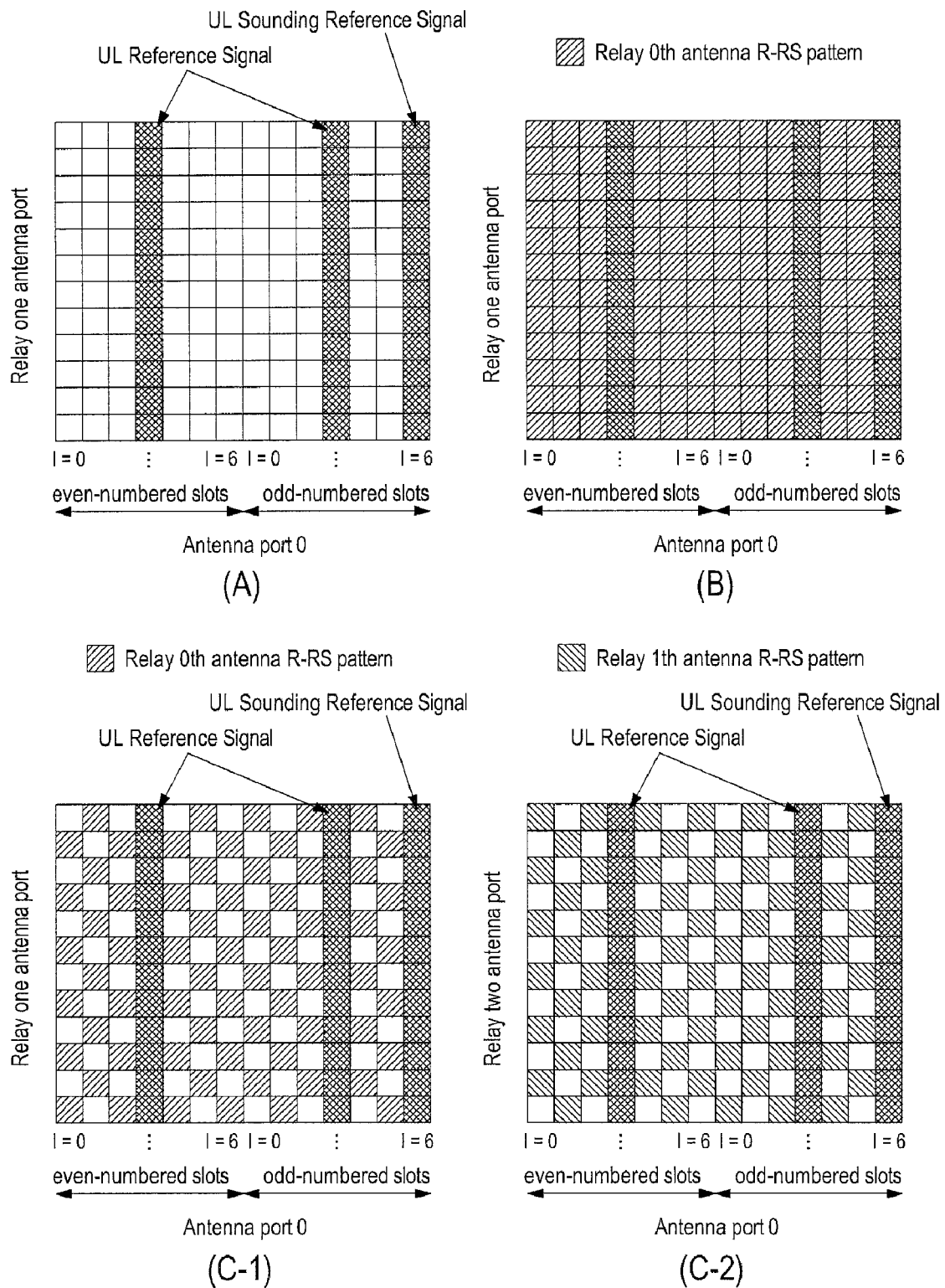
FIG. 16 is an exemplary diagram showing resource regions available for transmitting the R-RS at a UL relay and mapping a UL RS according to the number of transmitting antenna(s) of the UL relay in accordance with an embodiment of the present invention.

(1) Relay 20 may find a transmission position for the UL SI channel estimation with use of the parameters transmitted from base station 10. Base station 10 does not allocate the RBs, which are allowed to be transmitted to relay 20 for the UL SI channel estimation, to user equipment 30 which is being serviced by base station 10. Thus, relay 20 may transmit the UL R-RS's by mapping the UL R-RS's on the RBs allocated by the base station (allowed for transmitting the UL R-RS). FIG. 16 shows a UL R-RS transmitting scheme. The intervals for transmitting DMRS of user equipment 30 and the RSR for measuring the UL channel cannot be used when relay 20 transmits the UL R-RS, as shown (A) in FIG. 16. Relay 20 may transmit the UL R-RS based on the scheme (A) of FIG. 16. "(B)" of FIG. 16 is an exemplary transmission in one embodiment of a UL R-RS when the number of UL transmitting antennas of relay 20 is one. An exemplary transmission of another embodiment for two transmitting antennas of relay 20 can be described as "(c-2)" and "(c-1)" of FIG. 16.

(2) Relay 20 may perform a mapping of UL R-RS on the data transmission interval(s) of UL RB which is available for transmitting UL R-RS (except intervals for transmitting the DMRS and SRS) at step (1). Then, relay 20 may modulate the UL R-RS in a form suitable for RF transmission and transmit the UL R-RS through a transmitting end ("72" of FIG. 7) of the relay. At this time, base station 10 does not allocated RB, where relay 20 transmits the UL R-RS, to user equipment 10 being serviced.

(3) The UL R-RS transmitted from the transmitting end ("72" of FIG. 7) of the relay at step (2), may be received at a receiving end ("71" of FIG. 76) of the relay via a UL SI channel. The received signals are demodulated and transmitted to UL SI channel estimating unit 7124. UL SI channel estimating unit 7124 may perform the UL SI channel estimation by extracting the received signals at the position of the RB used for transmitting the UL R-RS at step (2). This process can be expressed by Equation 5 as follows.

$$Y_{Relay\ received} = H_{SI\_coefficient} \cdot X_{Relay\_RS} + N \quad \text{[Equation 5]}$$

Herein, $X_{Relay\_RS}$ is the UL R-RS which delay 20 transmits. The UL R-RS's of the transmitting antenna of the relay are orthogonal to each other, as shown in FIG. 16, so that it is possible to get channel values between the transmitting antenna and receiving antenna of the relays. SI values $H_{SI\_coefficient}$ of every antenna can be estimated by ignoring the value N of the noise in Equation 5 (the magnitude of error can be disregarded) and dividing the received signals $Y_{Relay\ received}$ by UL R-RS $X_{Relay\_RS}$ (channel information of UL SI is estimated partially).

(4) Relay 20 may calculate the channel values of UL SI of all bandwidths by repeating steps (1) to (3) with respect to all the bandwidths (estimating UL SI channel information for all the bandwidths).

Relay 20 may obtain the UL SI channel information of all the bandwidths through the initial registration process of the UL relay and the initial UL SI channel estimation process as mentioned above. Thereafter, relay 20 may remove SI by using the UL R-RS and relay the signals transmitted from user equipment 30 to the base station at the UL. This process is described in detailed below.

Relay 20 may receive data from user equipment 30. The received signals may be expressed as Equation 6 below.

$$Y_{received} = H_{ACCESS} \cdot X_{UE} + H_{SI} \cdot X_{Relay\_TX} + N \quad \text{[Equation 6]}$$

In Equation 6, $H_{SI}$ is the UL SI channel value, $X_{Relay\_TX}$ represents the signal transmitted from relay 20 to the UL. The removal is possible because relay 20 already knows the values of $H_{SI}$ and $X_{Relay\_TX}$. These values are the UL SI values which are to be removed in one embodiment of the present invention. Thus, the UL SI free signals can be expressed as Equation 7 below.

$$Y_{SI\text{-}Cancellation} = Y_{received} - \overline{H}_{SI} \cdot X_{Relay\_TX} \cong H_{ACCESS} \cdot X_{UE} + N \quad \text{[Equation 7]}$$

Signals remaining after removing the UL SI are the signals transmitted from user equipment 30. The RS of user equipment 30 may be used to decode the remaining signals. The estimation of $H_{ACESS}$ may be performed with DMRS transmitted by user equipment 30. Thus, the signal $X_{UE}$ transmitted by user equipment 30 may be decoded as Equation 8 below.

$$\overline{X}_{UE} = \frac{Y_{SI\_Cancellation}}{\overline{H}_{Access}} \quad \text{[Equation 8]}$$

Information of an access channel, which is an air interface channel between user equipment 30 and relay 20, may be obtained from the DMRS transmitted from user equipment 30, and the signal transmitted by user equipment 30 can be extracted from the remaining signal after removing the UL SI based on the information of the access channel. The signal $\overline{X}_{UE}$ transmitted from user equipment 30 may be forwarded to transmitting end 72 of the relay and modulated with a scheme (by applying a CQI, Pre-coding and a RI) suitable for the channel between base station 10 and the transmitting antenna of the relay. Further, the UL R-RS may be transmitted through a region of the UL signal. Thus, base station 10 can transmit the DL R-RS to estimate the SI channel continuously, and the information on the DL SI channel is updated by the continuous estimation and traceability. The DMRS may be transmitted with the UL signal for coherent detection of user equipment 30.

Figure 7:
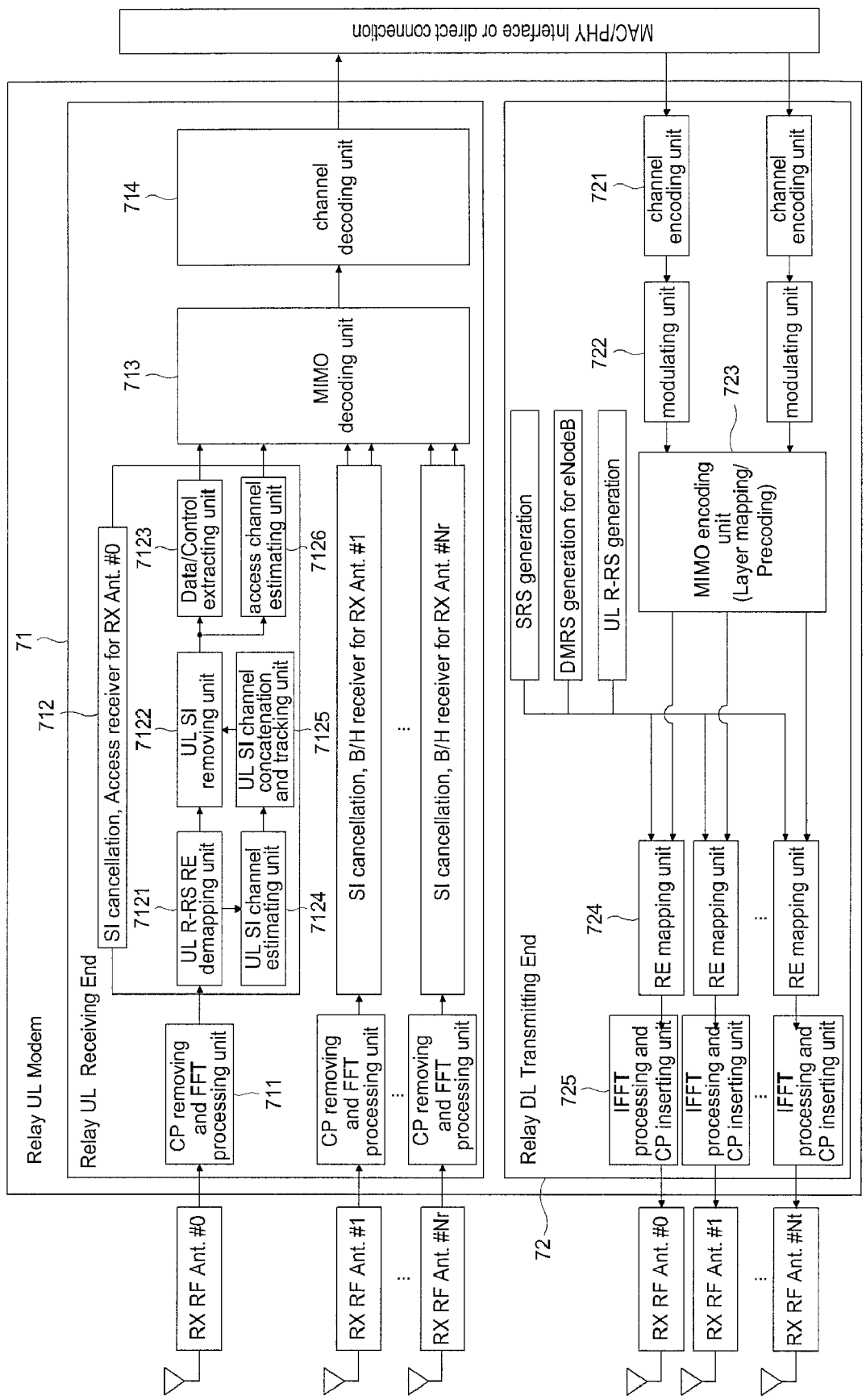
FIG. 7 shows a block diagram of a relay for removing self-interference (SI) of a UL in accordance with an embodiment of the present invention.

Referring to FIG. 7, the configuration of relay 20, which relays the signals from user equipment 30 to base station 10 at the UL, will be described below. FIG. 7 shows the detailed configuration of the relay for removing the UL self-interference (SI) in accordance with the present invention and the configuration of a UL modem of the relay which uses the DL R-RS.

UL transmitting end 72 of the relay may transmit the UL R-RS by mapping the UL R-RS on the interval (intervals to which data, excluding DMRS allocation region and SRS transmitting region).

DL receiving end 71 of the relay may estimate the UL SI channel information with the signals received from the UL transmitting end 72 of the relay and remove the UL SI component from the signals received from user equipment 30 based on the UL SI channel information. The UL SI components removed from the signals may be transmitted to base station through UL transmitting unit 72 of the relay.

CP removing and FFT processing unit 711 at UL receiving end 71 of the relay may remove the CP, which is inserted for preventing interference between symbols, from the signal received through a relay receiving antenna (RX Antenna) and convert the signals into the frequency domain by performing a Fast Fourier Transform (FFT) process.

UL R-RS RE demapping unit 7121 may separate the components of the UL R-RS which has undergone the FFT process.

UL SI channel estimating unit 7124 may estimate the UL SI channel by using the UL R-RS separated by UL R-RS RE demapping unit 7121. The estimated UL SI channel information does not relate to all the bandwidths. Thus, the UL SI channel concatenation and tracking unit 7125 may gather the partially estimated UL SI channel information and form DL SI channel information for all the bandwidths.

UL SI cancellation unit 7123 may remove the UL SI components from received signal $Y_{received}$ with use of the UL SI channel information ($H_{SI}$) and signal ($X_{relay\_TX}$) transmitted by UL transmitting end 72 of the relay. In the UL SI removed signals, only the signals transmitted by user equipment 30 may remain (see Equation 8). The signals transmitted by user equipment 30 may be divided into Data/Control components and so on, at Data/Control extracting unit 7123, and forwarded to MIMO decoding unit 713. The DMRS transmitted from user equipment 30 may be forwarded to access channel estimating unit 7126 for the use of estimating the access channel between user equipment 30 and relay 20. The information of the access channel (the air interface channel) between user equipment 30 and relay 20 may be transmitted to MIMO decoding unit 713. The MIMO decoding unit 713 may decode (extract) only the signals transmitted from user equipment 30 as shown in Equation 8 by using the information access channel.

The above processes may be performed for every receiving antenna of the relay 20. MIMO decoding unit 713 may perform a QAM slicing process, a combining process and so on. Channel decoding unit 714 may perform the convolutional decoding, the turbo decoding and so on according to the channel decoding method, and then may perform error correction. The MIMO decoding and the channel decoding may be performed with widely known methods.

Channel encoding unit 721 at UL transmitting end 72 of the relay may perform a coding process suitable for transmitting channels, and modulating unit 722 may perform the QAM modulation and so on and transmit the modulated signals to MIMO encoding unit 723. MIMO encoding unit 723 may perform layer mapping and pre-coding in consideration of the number of the transmitting antenna(s) and the characteristics of the channels. Resource mapping may be applied to the symbols which have undergone the MIMO encoding for transmitting the symbols to every transmitting antenna. The resource mapping, performed by RE mapping unit 724, is a process for allocating the data and the control information to the RE. During the process of estimating the initial UL SI channel, the UL R-RS for estimating the UL SI channel is the information which is mapped by RE mapping unit 724. OFDM transmitting symbols are formed by performing an Inverse FFT (IFFT) and inserting a CP at the IFFT processing and CP inserting unit, and then are transmitted through the relay transmitting antenna (TX Antenna).

Figure 9:
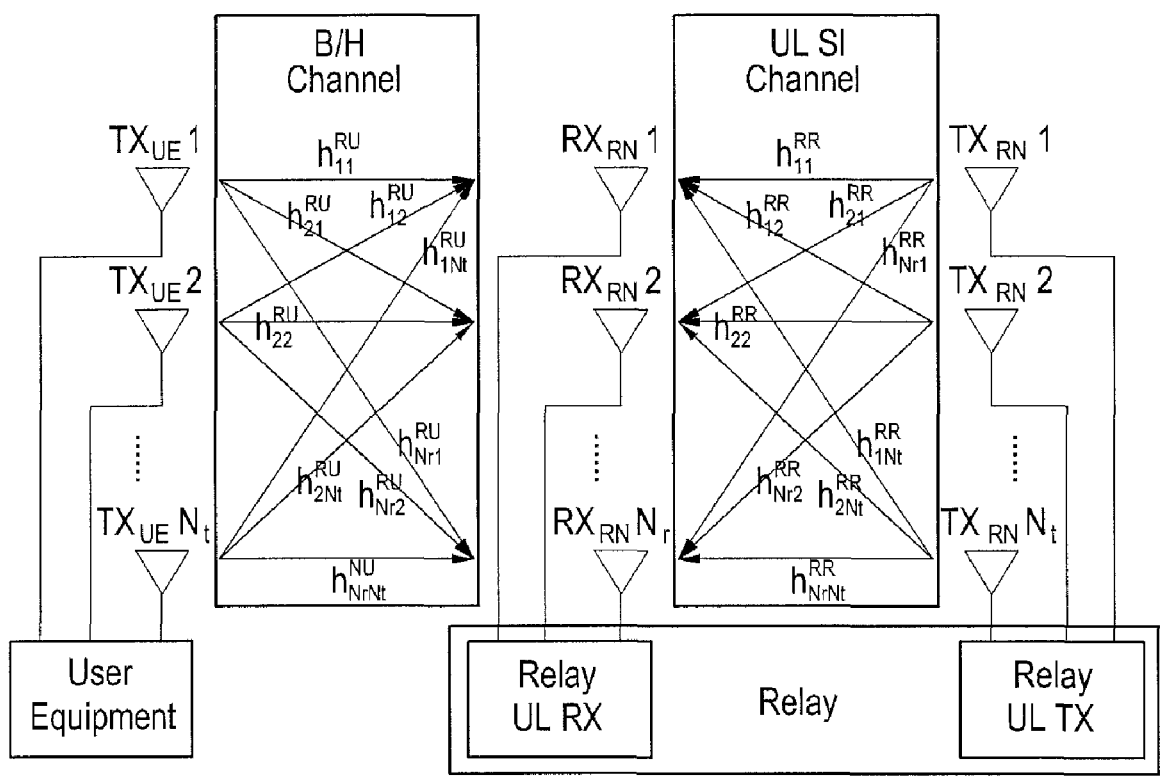
FIG. 9 shows a schematic diagram of a UL wireless channel of an LTE relay.

FIG. 9 shows wireless channels among the UL receiving antenna and the UL transmitting antenna of user equipment 30 and relay 20. The wireless channels between user equipment 30 and the receiving antennas of the relay are referred to as the access channels. The wireless channels between the transmitting antennas and the receiving antennas of the relay are referred to as the UL SI channels. The wireless channels are defined with respect to every transmitting port (TX port) and receiving port (RX port).

As explained above, the time division (Half Duplex), the time division of transmitting/receiving intervals (in other words, the relay does not transmit data to the user equipment (or the base station) for receiving data from the base station (or the user equipment), is not required. That is, it is possible to adopt the full duplex scheme. The advantages of applying the full duplex scheme are not only efficient use of the frequency resources but also decreasing time for exchanging data (reducing effectively latency).

In other embodiments, when several relays are in a region covered by one base station, a plurality of shared data channels may be allocated to remove the SI for the several relays. However, it is not efficient to use the shared data channels for estimating the SI. Moreover, the throughput of the whole systems is reduced as the number of the shared data channel increases. If the shared data channels of the same frequency bandwidth are allocated to the relays in the region covered by one base station for transmitting the R-RS among the relays and sequences with good autocorrelation and constant cross-correlation, the R-RS's of every relay can be discriminated with the use of orthogonal characteristic even though the R-RS's are allocated on the shared data channel of the same interval. Thus, the efficiency of the frequency can be improved compared with when different shared data channels are used in the relays. When several sequences are allocated in the same intervals of the shared data channels, the sequences need to be orthogonal to one another, for discrimination. In some instances, Zaoff-chu sequences can be used.

Further, the process of allocating the resources which use the R-RS in the relay, performed by the base station, may be an overhead cost. The overhead cost can be reduced effectively by applying semi-persistent scheduling or persistent scheduling to the resource allocation. The semi-persistent scheduling or persistent scheduling adopts the scheme of fixed resource allocation of PDSCH/PUSCH required to transmit data. Thus, the use of PDCCH, which is required for dynamic allocation of the shared channel, can be reduced. In the present invention, the overhead cost can be reduced by adopting the fixed resource allocation in stead of designing the resources, used at the relay for the R-RS, by the base station every time.

Also, in accordance with the present invention, it is possible to relay signals with the inbound scheme which does not require wave transformation with use of the R-RS at the relay, and the efficiency of the frequency and the throughput may be improved since the relay can support the MIMO. Furthermore, an oscillation-free system can be configured because exact SI components can be estimated. Also, the full duplex scheme can be applied to the backhaul channel, and thus decrease the time for exchanging data (reducing effectively latency) as well as efficient use of the frequency resources can be expected.

Although the present invention has been described with reference to some embodiments thereof, it should be understood that numerous other modifications and variations can be made by those skilled in the art that will fall within the scope of the principles of this disclosures. Also, it is intended that those modifications and variations be included within the scope of the invention as defined in the claims attached to this specification attached to this specification.

What is claimed is:

1. An apparatus for removing self-interference (SI), the apparatus comprising:
a transmitting end configured to receive parameters for channel estimation from a base station, and to map and transmit relay-reference signals (R-RS) through a region where the base station does not transmit signals, based on the parameters received from the base station; and
a receiving end configured to obtain SI channel values from signals transmitted by the transmitting end and received through a self-interference channel by using the R-RS and the receiving end to remove the SI from transmitting signals of an uplink or a downlink based on the SI channel values and to relay the SI removed transmitting signals.

2. The apparatus of claim 1, wherein the R-RS is transmitted with respect to at least one of a downlink (DL) and an uplink (UL), and the R-RS is mapped to a data transmitting region on a resource block (RB).

3. The apparatus of claim 2, wherein regions not used for transmitting the R-RS at the downlink include a reference signal (RS) signal transmitting region of the base station, a synchronization channel region, a common control channel region and a broadcasting channel region.

4. The apparatus of claim 2, wherein regions not used for transmitting the R-RS at the uplink include a demodulation RS (DMRS) signal transmitting region of an user equipment and a sounding reference signal (SRS) transmitting region for measurement of a UL channel.

5. The apparatus of claim 2, wherein the apparatus adopts a scheme of multiple antenna transmission, and every transmitting antenna transmits different R-RS patterns for the multiple antenna transmission.

6. The apparatus of claim 2, wherein the base station does not transmit data with the RB transmitting the downlink (DL) R-RS or the uplink (UL) R-RS.

7. A method of removing self-interference (SI), the method comprising:
   registering, at a base station, an SI apparatus configured to remove self-interference;
   at the SI apparatus, receiving parameters required for channel estimation from the base station;
   at the SI apparatus, mapping relay-reference signals (R-RS) to regions where the base station does not transmit signals based on the received parameters and transmitting the mapped R-RS signals through a transmitting end;
   at a receiving end of the SI apparatus, obtaining SI channel values from the signals transmitted by the transmitting end through a self-interference channel by using the R-RS; and
   at the receiving end, removing the SI from transmitting signals of an uplink or a downlink based on the SI channel values and relaying the SI removed transmitting signals.

8. The method of claim 7, wherein the R-RS is transmitted with respect to at least one of the downlink (DL) and the uplink (UL) and the R-RS is mapped to a data transmitting region on a resource block (RB).

9. The method of claim 8, wherein the parameters include parameter values for R-RS pattern to be transmitted to estimate the DL/UL SI, RBs for transmitting DL/UL R-RSs, and transmitting periods of the DL/UL R-RS.

10. The method of claim 9, wherein regions not used for transmitting the downlink (DL) R-RS include a reference signal (RS) signal transmitting region of the base station, a synchronization channel region, a common control channel region and a broadcasting channel region.

11. The method of claim 9, wherein regions not used for transmitting the uplink R-RS include a demodulation RS (DMRS) signal transmitting region of an user equipment and a sounding reference signal (SRS) transmitting region for measurement of a UL channel.

12. The method of claim 9, wherein the apparatus adopts a scheme of multiple antenna transmission, and every transmitting antenna transmits different R-RS patterns.

13. The method of claim 9, wherein the base station does not transmit data with the RB transmitting the downlink (DL) R-RS or the uplink (UL) R-RS.

14. A relay system comprising:
   a relay transmitting end configured to receive parameters for channel estimation from a base station, and to map and transmit relay-reference signals (R-RS) through a region where the base station does not transmit signals, based on the parameters received from the base station; and
   a relay receiving end configured to obtain self-interference (SI) channel values from signals transmitted by the relay transmitting end and received through a self-interference channel by using the R-RS, to remove the SI from transmitting signals of an uplink or a downlink based on the SI channel values and to relay the SI removed transmitting signals.

15. The system of claim 14, wherein a full duplex scheme is adopted for a transmitting/receiving interval at a backhaul link between the base station and the relay.

16. The system of claim 14, wherein when several relays are in a region covered by one base station, different resource regions are allocated to every R-RSs.

17. The system of claim of claim 14, wherein when several relays are in a region covered by one base station, the same resource region is allocated to every R-RSs by generating sequences with good autocorrelation and constant cross-correlation and using the sequences as the R-RS.

18. The system of claim of claim 14, wherein the base station allocates resources for the R-RS in a fixed manner.

* * * * *